Jan. 5, 1926.
J. P. LANE
1,568,853
STOVE BURNER AND WATER HEATER
Filed Feb. 17, 1925
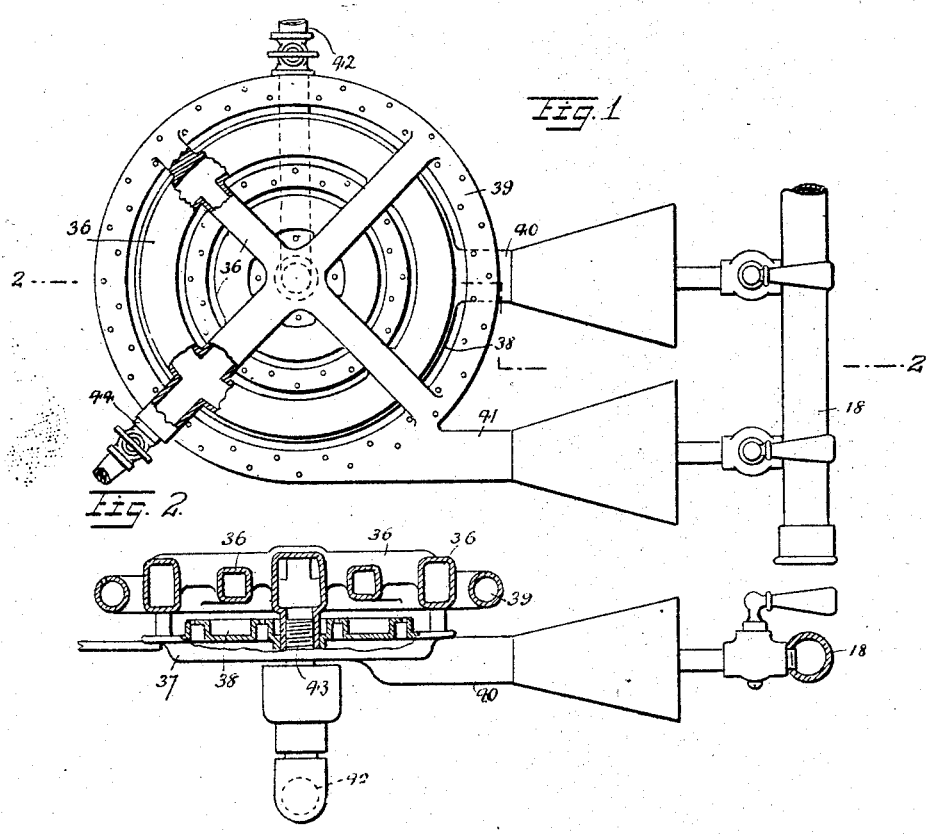
WITNESSES
INVENTOR
Joseph P. Lane
BY
ATTORNEYS Patented Jan. 5, 1926.

1,568,853

UNITED STATES PATENT OFFICE.

JOSEPH P. LANE, OF NEW YORK, N. Y.

STOVE BURNER AND WATER HEATER.

Application filed February 17, 1925. Serial No. 9,804.

*To all whom it may concern:*

Be it known that I, JOSEPH P. LANE, a citizen of Russia, and a resident of the city of New York, borough of Manhattan, in the county and State of New York, United States of America, have invented a new and Improved Stove Burner and Water Heater, of which the following is a full, clear, and exact description.

This invention relates to cooking and heating apparatuses.

It has been discovered that stoves of the burner type are susceptible of improvement as regards thermal efficiency and utility.

It is therefore the prime object of the present invention to maximize the thermal efficiency and to amplify the utility of burner type stoves with the usual fuel consumption by employing means in conjunction with the burner so that water may be heated or boiled while the usual cooking operations are carried out and therefore without the usual delay incident to separate operations, or the water heating operation only may be carried out if desired.

With the foregoing and other objects in view, the invention resides in the particular provision, relative disposition, and combination of parts hereinafter fully described and illustrated in the accompanying drawings, in which:

Fig. 1 is a plan view of the combined burner and water grid or coil of the present invention.

Fig. 2 is a transverse sectional view taken on the line 2—2 of Fig. 1.

The arrangement and connection of the parts of the present invention is such that water may be heated or boiled, and at the same time cooking operations may be carried out in the usual manner but without the usual delay incident to separate operations, and if desired cooking operations only may be carried out.

To this end it will be noted that use is made of a grid 36 and heating means 37. The heating means 37 consists of a burner 38 and a burner 39 which surrounds the grid 36. The burner 38 has a gas inlet 40, whereas the burner 39 has a gas inlet 41. The grid 36 is of hollow construction and comprises spaced concentric rings which are connected together in communication with each other to provide a tortuous passage. The grid 36 has a valved inlet pipe 42 connected thereto as at 43. The connection 43 is such that the grid 36 is detachably supported above the burner 38 in heating relationship. The burner 39 is supported in surrounding relationship with respect to the grid 36 by virtue of connections between the burner and the grid, and such connections may be integral or may be separate parts incorporated between the burner and grid. The grid 36 is also provided with a valved outlet 44. The arrangement and connection of parts of this combination permits cold water to be introduced to the grid 36 to be heated and the heated water to be drawn from the grid, and also makes provision for the application of heat for cooking purposes by virtue of the burner 39. If desired, both burners 38 and 39 may be employed for carrying out cooking operations.

I claim:

1. In a cook stove, the combination of two burners, a water grid having a valved inlet and a valved outlet, one of said burners surrounding said water grid substantially in the same plane, the other of said burners being arranged beneath said water grid, and means for maintaining the relative disposition of said burners and water grid.

2. In a cook stove, the combination of two burners and a water grid, said water grid having a valved inlet and a valved outlet, one of said burners surrounding said water grid and supported thereby substantially in the same plane, the other of said burners being arranged beneath said water grid, and means for separably connecting the water grid and the burner arranged beneath the same.

JOSEPH P. LANE.